(12) United States Patent
Zock

(10) Patent No.: US 12,318,755 B2
(45) Date of Patent: Jun. 3, 2025

(54) METHOD OF MANUFACTURING EROSION AND SEDIMENT AND POLLUTION CONTROL PRODUCTS USING RICE HULLS

(71) Applicant: MKB Company, LLC, Groveport, OH (US)

(72) Inventor: Michael A. Zock, Saxonburg, PA (US)

(73) Assignee: MAZCON, A KURTZ BROS. COMPANY, LLC, Chicago, IL (US)

( * ) Notice: Subject to any disclaimer, the term of this patent is extended or adjusted under 35 U.S.C. 154(b) by 101 days.

(21) Appl. No.: 18/241,987

(22) Filed: Sep. 4, 2023

(65) Prior Publication Data

US 2024/0033710 A1 Feb. 1, 2024

Related U.S. Application Data

(62) Division of application No. 17/459,534, filed on Aug. 27, 2021, now Pat. No. 11,745,166.

(Continued)

(51) Int. Cl.
  *B01J 20/24* (2006.01)
  *B01D 39/08* (2006.01)
  (Continued)

(52) U.S. Cl.
  CPC .......... *B01J 20/24* (2013.01); *B01D 39/083* (2013.01); *B01J 20/18* (2013.01); *B01J 20/20* (2013.01); *B01J 20/2804* (2013.01); *B01J 20/2805* (2013.01); *E02D 17/202* (2013.01); *B01D 2239/0428* (2013.01); *B01D 2239/10* (2013.01); *B01D 2239/1225* (2013.01);
  (Continued)

(58) Field of Classification Search
  CPC .......... B01D 39/083; B01D 2239/0428; B01D 2239/10; B01D 2239/1225; B01J 20/18; B01J 20/20; B01J 20/24; B01J 20/2804; B01J 20/2805; B01J 2220/44; E02B 3/125; E02D 17/202
  See application file for complete search history.

(56) References Cited

U.S. PATENT DOCUMENTS 2,079,779 A 5/1937 Tullis
2,201,279 A 5/1940 Willing
(Continued)

FOREIGN PATENT DOCUMENTS

WO WO-2018156517 A1 * 8/2018 ......... B01D 39/2058

OTHER PUBLICATIONS

Machine Translation of Yamashita et al (WO 2015/012039). (Year: 2015).
(Continued)

*Primary Examiner* — Brian A McCaig
(74) *Attorney, Agent, or Firm* — Blynn L. Shideler; Krisanne Shideler; BLK Law Group

(57) ABSTRACT

A method of manufacturing an erosion, sediment and pollution control product comprises heat treating a rice hull filler material for sterilizing the rice hull filler material and increasing the pollutant affinity of the rice hull filler material; filling a tubular containment member with the rice hull filler material in a manner allowing fluid to flow through the containment member and the rice hull filler material. The containment member is a geotextile which may include cellulose based threads treated to be hydrophobic.

20 Claims, 1 Drawing Sheet

Related U.S. Application Data

(60) Provisional application No. 63/070,891, filed on Aug. 27, 2020.

(51) Int. Cl.
  *B01J 20/18* (2006.01)
  *B01J 20/20* (2006.01)
  *B01J 20/28* (2006.01)
  *E02D 17/20* (2006.01)

(52) U.S. Cl.
  CPC ... *B01J 2220/44* (2013.01); *E02D 2300/0082* (2013.01); *E02D 2300/0085* (2013.01)

(56) References Cited

U.S. PATENT DOCUMENTS

| | | |
|---|---|---|
| 3,957,098 A | 5/1976 | Hepworth et al. |
| 4,044,525 A | 8/1977 | Forsgren |
| 5,595,458 A | 1/1997 | Grabhorn |
| 6,109,835 A | 8/2000 | Grabhorn |
| 7,226,240 B2 | 6/2007 | Tyler |
| 7,303,084 B2 | 12/2007 | McPhillips |
| 7,422,682 B2 | 9/2008 | McPhillips |
| 7,449,105 B2 | 11/2008 | Hastings |
| 7,654,292 B2 | 2/2010 | Sweningson |
| 8,821,076 B2 | 9/2014 | Tyler |
| 10,603,608 B2 | 3/2020 | Zock et al. |
| 10,745,881 B2 | 8/2020 | Zock et al. |
| 2011/0094691 A1 | 4/2011 | Nunn |
| 2014/0264157 A1 | 9/2014 | Kolomitsyn |
| 2015/0047298 A1 | 2/2015 | Szebalskie, Sr. et al. |
| 2016/0279541 A1 | 9/2016 | Zock et al. |
| 2019/0270041 A1 | 9/2019 | Lin |
| 2019/0388806 A1 | 12/2019 | Zock et al. |

OTHER PUBLICATIONS

Berube, D. et al. (2016) Geotextiles: From Design to Applications, Woodhead, 642 pp. (Office action cites p. 25). (Year: 2016).

Begum, H.S. et al. (2021) Journal of Textile Science and technology, 7, 152-160. (Year: 2021).

* cited by examiner

METHOD OF MANUFACTURING EROSION AND SEDIMENT AND POLLUTION CONTROL PRODUCTS USING RICE HULLS

RELATED APPLICATIONS

This application is a divisional application of U.S. patent application Ser. No. 17/459,534 filed Aug. 27, 2021 published Mar. 3, 2022 as publication number 2022-0062857 and titled "Erosion and Sediment and Pollution Control Products Using Heat Treated Rice Hulls", which publication and application is incorporated herein by reference.

U.S. patent application Ser. No. 17/459,534 claims priority to U.S. Patent Application Ser. No. 63/070,891, filed Aug. 27, 2020 titled "Erosion and Sediment and Pollution Control Products Using Heat Treated Rice Hulls and/or Geotextiles Implementing Hydrophobic Cellulose Based Threads" which is incorporated herein by reference.

BACKGROUND INFORMATION

1. Field of the Invention

The present invention relates to a method of manufacturing erosion, sediment and pollution control products, such as, but not limited to, filter socks.

2. Background Information

A filter sock (also called a compost filter sock, compost filter sleeve, silt sleeve, filter sock, compost filter tube, compost mesh sleeve, or similar terms) is a type of contained compost filter berm. A filter sock is a mesh tube or netting containment member or sleeve filled with mostly biodegradable cellulose based filler material, often called compost material, and that is conventionally placed perpendicular to sheet-flow runoff primarily to control erosion and retain sediment in disturbed areas. Filter socks are known to remove pollution from runoff as well. The phrase "filter sock" is used herein to be inclusive of a containment member, generally tubular, filled at least partially with cellulose based filler material in a filtering type matrix and includes straw waddles, switchgrass filled cock product, weighted sediment tubes, coir logs and road wattles.

The concept of a filter sock formed as a mesh structures filled with cellulose based filler goes at least as far back as the mid 1930's in U.S. Pat. Nos. 2,079,779 and 2,201,279, by Mr. Willing, which are incorporated herein by reference. These early teaching disclosed the use of brush or bundled weeds or straw as the compost filler.

Improvements in filter socks are shown in, for example U.S. Pat. Nos. 3,957,098, 4,044,525, 5,595,458, 6,109,835 7,303,084, 7,226,240, 7,422,682, 7,449,105, 8,821,076, and 10,603,608. For a more detailed background on filter socks in general see U.S. Patent Publications 2016-0279541 (Now U.S. Pat. No. 10,745,881) and 2015-0047298, which are incorporated herein by reference. Some of the people and associated entities doing work in the evolution, proliferation of the modern filter sock are John Engwer at FilterMitt, Kevin Lane at Lane ECS, Tom Truelsen at Soil Tek, Rod Tyler at Filtrexx, Keith and Kevin Weaver at Weaver Express, and Doug Cadwell at River Valley Organics. Today's filter sock is a modern-day version of the original Willing patented device.

Blower trucks have been used for mobile in-situ filling of filter socks. Blower trucks represent a considerable expense and are not applicable for all terrains. Additionally, a portable hopper and auger feeder design has been used for in-situ construction of filter socks. A conventional auger system is shown in U.S. Pat. No. 7,654,292, which is incorporated herein by reference. See also U.S. Patent Publication 2019-0388806, which is incorporated herein by reference.

The reference to the cellulose based filler material within the containment sleeve of a filter sock as "compost material" has caused some confusion in the art as it is not clear from even the users of the phrase if this is requiring the filler material to undergo a certain amount of composting prior to being placed in the containment member or sleeve, or describing the biodegradable aspect of the material after it has entered the containment member or sleeve. The latter description seems to be more accurate as the industry often utilizes freshly chipped or ground wood products as "compost material" without any designated pre-filling composting time. The industry also utilizes biodegradable products that actually have undergone some composting prior to use as a filler in a filter sock. Due to this confusion the present application refrains from referencing filter socks as "compost filter socks", which is a common term in the art.

The cellulose known to fill filter socks has been moderately effective at remediating some pollution in environmental space due to adsorption, absorption, ionic attraction, armoring and the like. Further some academic studies have shown that selective treatments, such as chemical treatments like bleaching, salt additives, or heat treatments can improve the cellulose bio-reactivity making the filler more effective at pollution control. However, many, if not most, academically proposed fill treatment processes are simply not economically viable in practice for common cellulose filter sock fill material. Composting of cellulose filter material prior to use, mentioned above, is actually one known process that is commercially viable and does yield some improvements in bio-reactivity of cellulose based filter sock fillers.

In the broader environmental market, kiln drying of cellulose products is another known treatment process for select products. The applicant MKB has utilized the kiln drying of wooden silt fence stakes to alter the bio-active aspects of the cellulose stake essentially creating a harder stake that minimized mold/fungal growth in long storage yielding a longer shelf life, particularly for pre-assembled products.

A wide variety of types of cellulose based filler material has been proposed for filter socks. Generally, other than mixing types of cellulose based filler materials and composting the same, there has been limited processing of the filler material in actual practice. There remains a need in the art for optimizing the performance of specific filler materials in filter socks, and in the performance of filler material in erosion, sediment and pollution control products generally.

Aside from the types of cellulose based filler materials, a large variety of materials have been proposed for forming the containment member for cellulose filler material in erosion, sediment and pollution control products, like filter socks. Natural or cellulose based fiber nettings have been proposed including those formed of cotton and burlap (typically jute or hemp), however, in filter socks the plastic netting dominates the market because of the needed longevity as well as cost considerations. This use of plastic for netting does have a negative environmental impact. For example the applicant is a leading manufacturer of filter socks with plastic netting sleeves and has estimated that the applicant will utilize enough plastic netting to manufacture 50 million water bottles in 2020 alone. Natural fiber based netting/containment members that yield viable field times would substantially reduce this reliance on plastic and yield environmental benefits. The natural fiber based netting/containment members proposed to date have proven insufficient for such applications in practice.

SUMMARY OF THE INVENTION

One aspect of this invention is directed to an erosion, sediment and pollution control product comprising a rice hull filler material which has been heat treated sterilizing the rice hull filler material and increasing the pollutant affinity of the rice hull filler material; and a containment member containing the rice hull filler material and allowing fluid to flow through the containment member and the rice hull filler material, and methods of making the same. The containment member may be formed as a geotextile which includes cellulose based threads treated to be hydrophobic.

The features that characterize the present invention are pointed out with particularity in the claims which are part of this disclosure. These and other features of the invention, its operating advantages and the specific objects obtained by its use will be more fully understood from the following detailed description in connection with the attached figures.

DESCRIPTION OF THE PREFERRED EMBODIMENTS

Figure 2:
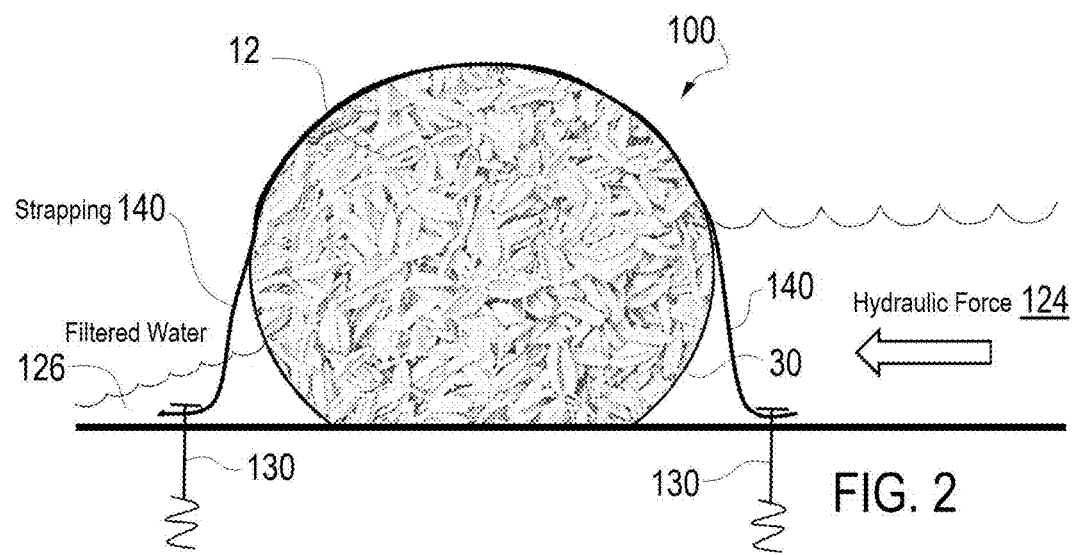
FIG. 2 is a sectional schematic of a field implementation of an erosion, sediment and pollution control product comprising a rice hull filler material in accordance with one aspect of the present invention.

One aspect of this invention is directed to an erosion, sediment and pollution control product 100 shown in FIG. 2 comprising a rice hull filler material 12 which has been heat treated sterilizing the rice hull filler material and increasing the pollutant affinity of the rice hull filler material; and a containment member 30 containing the rice hull filler material and allowing fluid to flow through the containment member and the rice hull filler material. The containment member 30 may be formed as a geotextile which includes cellulose based threads treated to be hydrophobic.

Rice hulls are the outer coverings of seeds, or grains, of rice. The rice hulls, also known as rice husks, protects the seed during the growing season and is formed from cellulose, specifically lignin, and other hard materials, including opaline silica. The hull is hard to eat or swallow and mostly indigestible to humans because of its enriched fiber components. The rice hull filler material 12 of the present invention is made by heat treating rice hulls.

The heat treatment of the rice hulls forming the filler material 12 will sterilize the husks, in other words it will kill the biologics in the material. Rice seeds, weed seeds, bacterium, fungus, micro-organisms are neutralized in the heat-treating process. This is important in increasing the shelf life of erosion, sediment and pollution control product 100. Without such heat treatment products 100 stored in a warehouse for long periods may experience loss due to fungal or other biologic growth. Further this sterilization process helps mitigate the migration of invasive and destructive species that might otherwise be introduced into a new environment with the use of the resulting product 100.

Additionally, the heat-treating process has been found to substantially increase the rice hull's ability to attract and maintain pollutants, particularly ionically charged pollutants, in liquid streams moving through the product 100. The heat treating process which is sufficient to sterilize the material is also believed to soften and open up the cellulose.

The preferred heat-treating process for treating the rice hulls is boiling, also (specifically for rice and rice hulls) known as parboiling. Parboiling (or leaching) is a term stemming originally from the cooking arts and, as it relates to food preparation, it is the partial or semi boiling of food as the first step in cooking. The word is from the Old French 'parboillir' (to boil thoroughly) but by mistaken association with 'part' it has acquired its current cooking definition. Parboiling is also been known to be used for removing poisonous or foul-tasting substances from foods, and to soften vegetables before roasting them. The food items are added to boiling water and cooked until they start to soften, then removed before they are fully cooked. Parboiling rice hulls will sterilize the rice hull filler material and increase the pollutant affinity of the rice hull filler material, likely by opening the cellular structure. Parboiling rice hulls represents a cost-effective method of forming the rice hull filler material 12.

Parboiling as used herein is a heat treatment or collection of heat treatments that collectively sterilize and render any residual rice kernels and other seeds non-viable. This general process includes steeping rice hulls in water at temperatures in excess of 140 degrees F. The process may include subsequent steps such as steaming under pressure to temperatures exceeding 212 degrees F. followed by hot air drying at 500 degrees F., or higher.

The containment member 30 is a tubular mesh or netting material and must have opening that are sufficient to contain the rice hull filler material 12 (together with other additives that may be present). A mesh or netting material is sufficient to contain the rice hull filler material 12 where less than 1% of the rice hulls filler material 12 pass through the netting material 30 of the product after 30 seconds of vigorous shaking of the filled product 100. Pollution control products 100 do not exhibit loss of filler in the field where they pass this manual containment test. The containment member 30 may be referenced as a tubular mesh member 30.

The tubular mesh member 30 is a geotextile and exhibits a fabric flow test of at least 100 Gallons per minute based upon the permittivity test results in the ASTM 4491 type C testing protocol (as this testing protocol exists as of Aug. 27, 2020). Permittivity is a laboratory-measured characteristic of the geotextile, expressing the flow capacity of the geotextile per unit of head. American Society for Testing and Materials (ASTM) D-4491, "Standard Test Methods for Water Permeability of Geotextiles by Permittivity" is the industry standard method for measuring geotextile permittivity, and this application is referencing the test as it existed on Aug. 27, 2020. This standard test is an index test and measures water flow rate through a geotextile in an isolated condition. Once permittivity is known, the flow capacity of the geotextile can be calculated for given thickness of geotextile. The tubular mesh member 30 preferably exhibits a fabric flow test of between 100 and 700 Gallons per minute, and more preferably 200-400 Gallons per minute based upon the permittivity test results in the ASTM 4491 type C testing protocol.

The tubular mesh member 30 is a geotextile which may further includes cellulose based threads treated to be hydrophobic. The natural cellulosic fibers include cotton, flax, hemp, jute, and ramie. The major man-made cellulosic fiber is rayon, a fiber produced by regeneration of dissolved forms of cellulose. One preferred cellulose based thread used in the present invention is lyocell, which is a form of rayon that consists of cellulose fiber made from dissolving pulp (bleached wood pulp) using dry jet-wet spinning. Lyocell was developed in 1972 by a team at the now defunct American Enka fibers facility at Enka, North Carolina. The U.S. Federal Trade Commission defines lyocell as a fiber "composed of cellulose precipitated from an organic solution in which no substitution of the hydroxyl groups takes place and no chemical intermediates are formed" and this definition is implemented herein. Lyocell threads that are treated to be hydrophobic represent a cost-effective choice of fiber for forming the member 30.

The cellulose-based threads tend to be hydrophilic and this can lead to premature degradation of the fabrics in the field for products 100. In the present invention the cellulose-based threads of member 30 may be treated to be hydrophobic, and may be treated with one of mineral oil, beeswax, paraffin, petroleum jelly, lanolin, plant-based oils, and combinations thereof.

Waxed cotton is one example of a commercially available cellulose-based thread which has been treated to be hydrophobic. Waxed cotton is cotton impregnated with a paraffin or natural beeswax based wax, woven into or applied to the cloth. Waxed cotton was popular from the 1920s to the mid-1950s and was developed from the sailing industry in England and Scotland. "Waxed thread" is also a known product and defines any thread type that includes a light coating of wax and generally used for hand stitching leather and canvas, the phrase waxed thread is not limited to cellulose based threads, and thus broader than the scope of the present invention.

Using one of, or combinations of cellulose based threads treated to be hydrophobic to form the tubular mesh member 30 results in a reduction of the use of plastic in the product and is generally favorable to the environment. Treating the cellulose-based threads to be hydrophobic, such as with treatments with at least one of mineral oil, beeswax, paraffin, petroleum jelly, lanolin and plant-based oils, is believed to increase the longevity of the product in the field to 100-1500% of the effective life of untreated threads in products 100.

FIG. 2 is a sectional schematic of a field implementation of an erosion, sediment and pollution control product 100 comprising a rice hull filler material 12 in the containment member 30 in accordance with one aspect of the present invention. The FIG. 2 is schematic and not to any scale as the filler material 30 is shown much larger in scale than the illustrated containment member 30 to better illustrate the filtration matrix of the filler 12. In FIG. 2 the product 100 is held in place by strapping 140 with securement members or pins 130 that have previously been proposed by the Applicant in the above identified applications. Conventional stakes could also be used to secure the product 100 in position wherein water from an upstream side 124 is forced through the product 100 which will retain sediment and pull pollution products from the stream allowing filtered cleaner water to exit the downstream side 126.

The product 100, in an alternative embodiment, may further include a clarity additive 14 to improve performance. The clarity additive 14 comprises at least one of zeolite, kenaf, activated carbon and a peat derivative. The preferred clarity additive 14 utilizes a combination of all of zeolite, kenaf, activated carbon and a peat derivative.

Zeolite is a microporous, aluminosilicate mineral commonly used as commerce-p al adsorbent catalyst. Zeolite has a porous structure that can accommodate a wide variety of cations, such as $Na^+$, $K^+$, $Ca^{2+}$, $Mg^{2+}$ and others which are rather loosely held and can readily be exchanged for others in a contact solution. In the preferred clarity additive 14 zeolite and kenaf form 80%+/−10% by volume of the clarity additive, with the zeolite added in a volume ratio of about 1:0.1 to 1:10 of the kenaf. The term "about" means+/−5% in this application unless otherwise specified.

Kenaf is a plant in the family Malvaceae also called Deccan hemp and Java jute. The name also applies to the fiber obtained from this plant. The fibers in kenaf are found in the bast (bark) and core (wood). The bast constitutes 40% of the plant. "Crude fiber" separated from the bast is multi-cellular, consisting of several individual cells stuck together. The individual fiber cells are about 2-6 mm long and slender. The cell wall is thick (6.3 μm). The core is about 60% of the plant and has thick (≈38 μm) but short (0.5 mm) and thin-walled (3 μm) fiber cells. The stems produce two types of fiber: a coarser fiber in the outer layer (bast fiber), and a finer fiber in the core. The bast fiber are used to make ropes. The kenaf material of the preferred clarity additive 14 is kenaf core fibers that have been harvested and dried. In the preferred clarity additive 14 zeolite and kenaf core material form roughly 80%+/−10% by volume of the clarity additive, with the kenaf core material added in a volume ratio of about 1:0.1 to 1:10 of the zeolite.

Activated carbon, also called activated charcoal, is a form of carbon processed to have small, low-volume pores that increase the surface area available for adsorption or chemical reactions. In the preferred clarity additive 14 the activated carbon is formed from coconut shells that have been baked black and the activated carbon and peat material form roughly 20%+/−10% by volume of the clarity additive 14, with the activated carbon material added in a volume ratio of about 1:0.1 to 1:10 of the peat derivative.

Reed-sedge peat is a natural, partially decomposed plant material, formed from a mixture of reeds, sedges, grasses and some hypnum mosses occurring in wetlands and containing one third to two thirds peat fibers. Reed-sedge peat has an inherent affinity for dissolved heavy metals, and reed-sedge peat is commercially available in a granular form that is easy to use. The preferred clarity additive 14 of the present invention uses granular reed-sedge peat in the amounts cited above.

In embodiments of the product 100 that implements the clarity additive 14, the amount will depend upon the primary focus of the product 100. For product 100 with a diameter of the member 30 over 6" the product 100 will be primarily for erosion and sediment control with added pollution retention, while a diameter of less than 6" for the member 30 will yield products 100 that are primarily focused on pollution control in runoff with some sediment retention characteristics. For product 100 with a diameter of the member 30 over 6" the clarity additive 14, if used, is added in about 1:20 to 1:80 by volume ratio to the rice hull filler material 12. More preferably for products 100 with a diameter of the member 30 over 6" the clarity additive 14, if used, is added in about 1:30 to 1:50 by volume ratio to the rice hull filler material 12. For product 100 with a diameter of the member 30 at or under 6" the clarity additive 14, if used, is added in about 1:1.5 to 1:7 by volume ratio to the rice hull filler material 12. More preferably for product 100 with a diameter of the member 30 at or under 6" the clarity additive 14, if used, is added in about 1:2 to 1:5 by volume ratio to the rice hull filler material 12.

In a further alternative of the present invention a weighting stone 15, preferably a double washed pea gravel 15, may be added in amounts of about and typically about 15%, by volume of the other fillers (the rice hulls 12 and, optionally, the clarity additive 14). The weighting stone 15 alternative may be implemented with or without the clarity additive 14. The weighting stone will be used in products 100 having a diameter of tubular mesh 30 at or generally under 12".

Figure 1:
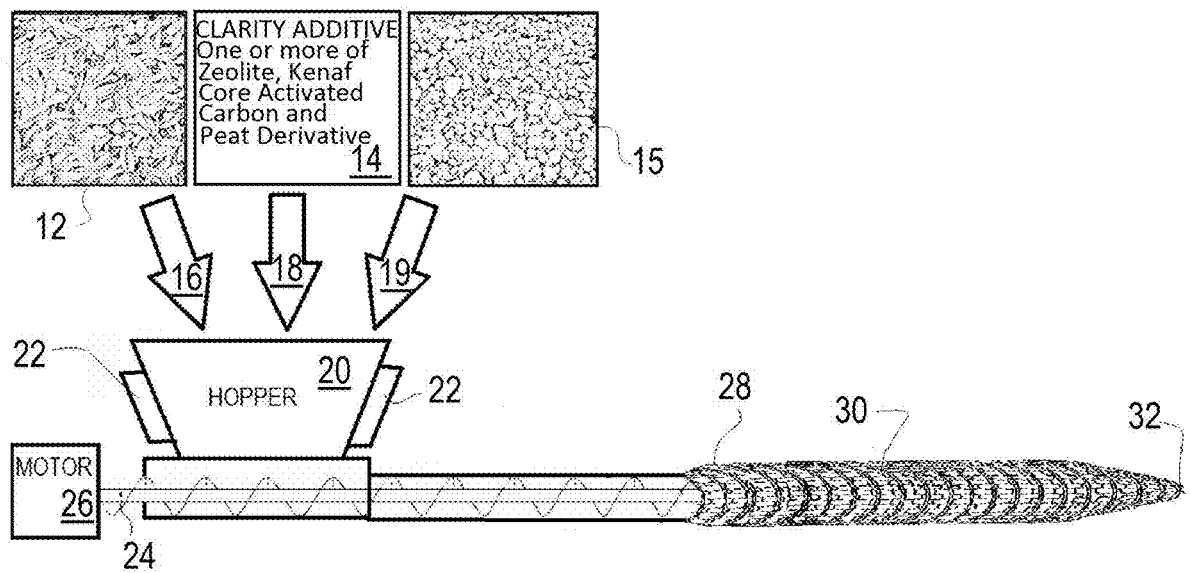
FIG. 1 is a schematic illustration showing the manufacture of erosion, sediment and pollution control product comprising a rice hull filler material in accordance with one aspect of the present invention.

FIG. 1 is a schematic illustration showing the manufacture of erosion, sediment and pollution control product 100 comprising a rice hull filler material 12 in accordance with one aspect of the present invention. Specifically, FIG. 1 shows the use of a known hopper 20 fed mixing auger 24 for forming products 100. The rice hulls 12 are conveyed at 16 to the hopper and the conveyance 16 may be gravity, pneumatic or other. If present the clarity additive 14 is conveyed at 18 to the hopper 20 and the conveyance 18 of the clarity additive 14 may generally be gravity or other feeding (belt). Similarly, if present the double washed pea gravel 15 is conveyed at 19 to the hopper 20 and the conveyance 19 of the stone 15 is likely via gravity or feeding belt.

The hopper 20 may include devices to assist the feeding such as vibrators 22. The use of a gravity feed hopper 20 with vibration from vibrators 22 are sufficient to preliminary mix the filler 12 with other constituents (the clarity additive 14 and/or the stones 15 if either are used) for delivery to a conveying-mixing auger 24 driven by motor 26.

The auger 24 will convey and mix the filler 12 and other constituents if present to form a blended generally homogeneous mixture before it is deposited within the netting material or member 30 to form the product 100 of the invention.

A sleeve of netting material or member 30 is on the outlet tube of the conveying-mixing auger 24 and a leading end of the material 30 is pulled off of the outlet tube and sealed at 32 by a tying mechanism or closing mechanism. Simply knotting the end is typically sufficient for forming the seal or closure 32, but bands, clips, fastener may be used as well. When a sufficient length of material of member 30 has been filled with the blended filler material 12+optional additive 14 and/or stones 15) and the product 100 of the invention is the desired length for the intended usage, then the proximal end will be sealed, generally in the same method as the closure 32. The sleeve of netting material forming member 30 may be cut so that multiple products 100 may be formed from one sleeve of netting material or member 30 or the sleeve may be sized to form the necessary length of a single product.

Where the sleeve of material 30 is cut to form multiple products 100 from one sleeve of netting material 30, the proximal end of one sleeve of netting material may be reached before the end of that desired length of the product 100 being formed, in which case the filling process is halted and a new sleeve is placed onto the outlet tube by feeding the outlet tube and the partially formed product 100 through the new sleeve of material 30. The leading end of the material 30 is overlapped with the trailing end of the prior sleeve while the trailing end is still on the outlet tube and the overlapped portions are coupled together such as with a few zip-ties or the like. With the new sleeve of material 30 thus positioned the process resumes.

The present invention is not limited to filter socks. The cellulose-based threads treated with material to make them hydrophobic may be implemented in rolled erosion control blanketing, silt fence edging, and mainly in any erosion, sediment and pollution control product where longevity and bio-degradation are desired. Similarly the heat treated rice hulls, together with a suitable containment member may be implemented in other erosion, sediment and pollution control products that do not generally identify as a filter sock, such as a grate cover in which the containment member is shaped in a rectangular grate covering shape only a few inches in height.

While the invention has been shown in several particular embodiments it should be clear that various modifications may be made to the present invention without departing from the spirit and scope thereof. The scope of the present invention is defined by the appended claims and equivalents thereto.

What is claimed is:

1. A method of manufacturing an erosion, sediment and pollution control product comprising:
   Sterilizing at least a portion of an erosion, sediment and pollution control product filler material, wherein the filler material includes rice hulls;
   Homogenizing the filler material;
   Providing a tubular mesh member geotextile which exhibits a fabric flow test of at least 100 Gallons per minute based upon permittivity test results in a ASTM 4491 type C testing protocol;
   Filling the tubular mesh member with the homogenized filler material containing the rice hulls and wherein the filled tubular mesh member and filler material is configured to allow fluid to flow through the mesh member and the filler material.

2. The method of manufacturing an erosion, sediment and pollution control product according to claim 1, further including the step of treating the filler material to increase the pollutant affinity of the filler material.

3. The method of manufacturing an erosion, sediment and pollution control product according to claim 2, wherein the tubular mesh member forms the outer perimeter of the product and the tubular member has a diameter less than 6".

4. The method of manufacturing an erosion, sediment and pollution control product according to claim 2, wherein the step of treating the filler material to increase the pollutant affinity of the filler material includes the step of adding an additive, wherein the additive comprises at least one of zeolite, kenaf, activated carbon and a peat derivative.

5. The method of manufacturing an erosion, sediment and pollution control product according to claim 4, wherein the additive comprises a combination of at least two of the group consisting of zeolite, kenaf, activated carbon and a peat derivative.

6. The method of manufacturing an erosion, sediment and pollution control product according to claim 4, wherein the additive comprises a peat derivative and wherein the peat derivative is granular.

7. The method of manufacturing an erosion, sediment and pollution control product according to claim 4, wherein the additive is present in a volume ratio from about 1:1.5 to 1:7 of the filler material.

8. The method of manufacturing an erosion, sediment and pollution control product according to claim 4, wherein the additive is present in a volume ratio from about 1:20 to 1:80 of the filler material.

9. The method of manufacturing an erosion, sediment and pollution control product according to claim 2, wherein the step of sterilizing at least a portion of the erosion, sediment and pollution control product filler material includes a heat treatment.

10. The method of manufacturing an erosion, sediment and pollution control product according to claim 2, wherein the tubular mesh member includes lyocell.

11. A method of manufacturing an erosion, sediment and pollution control product comprising:
Treating at least a portion of an erosion, sediment and pollution control product filler material to increase the pollutant affinity of the filler material, wherein the filler material includes rice hulls;
Homogenizing the filler material;
Providing a tubular mesh member geotextile which exhibits a fabric flow test of at least 100 Gallons per minute based upon permittivity test results in a ASTM 4491 type C testing protocol;
Filling the tubular mesh member with the homogenized filler material containing the rice hulls and wherein the filled tubular mesh member and filler material is configured to allow fluid to flow through the mesh member and the filler material.

12. The method of manufacturing an erosion, sediment and pollution control product according to claim 11, wherein the tubular mesh member forms the outer perimeter of the product and the tubular member has a diameter greater than 6".

13. The method of manufacturing an erosion, sediment and pollution control product according to claim 11, wherein the step of treating the filler material to increase the pollutant affinity of the filler material includes the step of adding an additive, wherein the additive comprises at least one of zeolite, kenaf, activated carbon and a peat derivative.

14. The method of manufacturing an erosion, sediment and pollution control product according to claim 13, wherein the additive comprises a combination of at least two of the group consisting of zeolite, kenaf, activated carbon and a peat derivative.

15. The method of manufacturing an erosion, sediment and pollution control product according to claim 14, wherein the additive is present in a volume ratio from about 1:20 to 1:80 of the filler material.

16. The method of manufacturing an erosion, sediment and pollution control product according to claim 13, wherein the additive comprises a peat derivative and wherein the peat derivative is granular.

17. The method of manufacturing an erosion, sediment and pollution control product according to claim 13, wherein the additive is present in a volume ratio from about 1:1.5 to 1:7 of the filler material.

18. The method of manufacturing an erosion, sediment and pollution control product according to claim 11, further including a step of sterilizing at least a portion of the erosion, sediment and pollution control product filler material with a heat treatment.

19. The method of manufacturing an erosion, sediment and pollution control product according to claim 11, wherein the tubular mesh member includes a cellulose based threads which is treated to be hydrophobic with at least one of mineral oil, beeswax, paraffin, petroleum jelly lanolin and plant based oils.

20. The method of manufacturing an erosion, sediment and pollution control product according to claim 11, wherein the step of treating the filler material to increase the pollutant affinity of the filler material includes the step of heat treating the filler material.

* * * * *